United States Patent
Hogo et al.

(10) Patent No.: US 11,218,693 B2
(45) Date of Patent: Jan. 4, 2022

(54) SENSOR UNIT DRIVING DEVICE

(71) Applicant: EIZO Corporation, Ishikawa (JP)

(72) Inventors: Hidekazu Hogo, Ishikawa (JP); Kentaro Kojima, Ishikawa (JP)

(73) Assignee: EIZO Corporation, Hakusan (JP)

( * ) Notice: Subject to any disclaimer, the term of this patent is extended or adjusted under 35 U.S.C. 154(b) by 71 days.

(21) Appl. No.: 16/465,287

(22) PCT Filed: Dec. 19, 2016

(86) PCT No.: PCT/JP2016/087758
§ 371 (c)(1),
(2) Date: May 30, 2019

(87) PCT Pub. No.: WO2018/116339
PCT Pub. Date: Jun. 28, 2018

(65) Prior Publication Data
US 2019/0394455 A1 Dec. 26, 2019

(51) Int. Cl.
*H04N 17/00* (2006.01)

(52) U.S. Cl.
CPC .................. *H04N 17/004* (2013.01)

(58) Field of Classification Search
CPC .. H04N 17/004; H04N 17/045; G06F 1/1601; G06F 1/1607; G01J 1/0403; G09G 5/00; G09G 5/02; G09G 2320/0666; G09G 2320/0693; G09G 2330/12; G09G 2360/145
See application file for complete search history.

(56) References Cited

U.S. PATENT DOCUMENTS

| | | | |
|---|---|---|---|
| 9,900,591 B2 * | 2/2018 | Sung | F16M 11/045 |
| 2008/0204437 A1 | 8/2008 | Jensen | |

(Continued)

FOREIGN PATENT DOCUMENTS

| | | |
|---|---|---|
| CN | 103562981 A | 2/2014 |
| JP | 2012-080208 A | 4/2012 |
| JP | 2012-150213 A | 8/2012 |

(Continued)

OTHER PUBLICATIONS

International Search Report dated Mar. 14, 2017 in corresponding International application No. PCT/JP2016/087758; 2 pages.

(Continued)

*Primary Examiner* — Paulos M Natnael
(74) *Attorney, Agent, or Firm* — Maier & Maier, PLLC

(57) ABSTRACT

Provided is a sensor unit driving device capable of protruding and retracting a sensor unit for sensing a display surface without projecting a bezel in front of a display surface while reducing a width of a bezel. The present invention is to provide a sensor unit driving device comprising a display panel comprising a display surface for displaying an image, a sensor unit with a sensor, and an actuator driving the sensor unit. The sensor unit is configured to be on a lateral surface side or a rear surface side of the display panel when the sensor unit is in a retreat position and is configured so that the sensor faces the display surface when the sensor unit is in a detection position. The actuator is configured to drive the sensor unit for switching between the retreat position and the detection position by a movement of the sensor unit.

8 Claims, 6 Drawing Sheets

Detection position

(56) References Cited

U.S. PATENT DOCUMENTS

2014/0091210 A1* 4/2014 Hogo .................. G01J 1/0403
250/216
2014/0192077 A1 7/2014 Gomi et al.

FOREIGN PATENT DOCUMENTS

TW          I560372  B    12/2016
WO     2015/147375 A1    10/2015
WO     2016/059712 A1     4/2016

OTHER PUBLICATIONS

Chinese Office Action dated Nov. 4, 2020, in connection with corresponding CN Application No. 201680091351.5 (11 pp., including machine-generated English translation).

Extended European Search Report dated Oct. 16, 2019, including the Supplementary European Search Report and the European Search Opinion, in connection with corresponding EP Application No. 16924338.3 (6 pgs.).

* cited by examiner

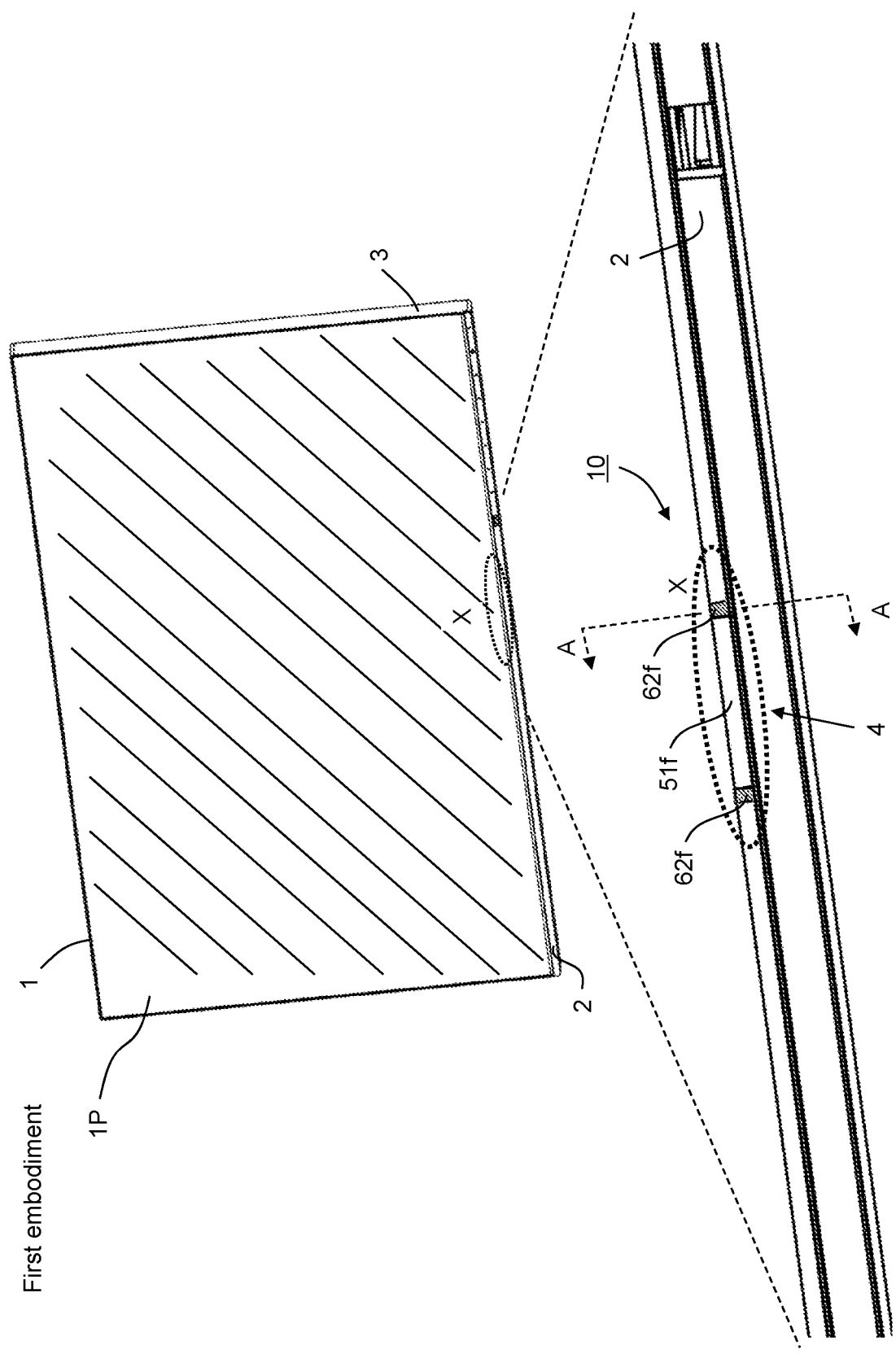

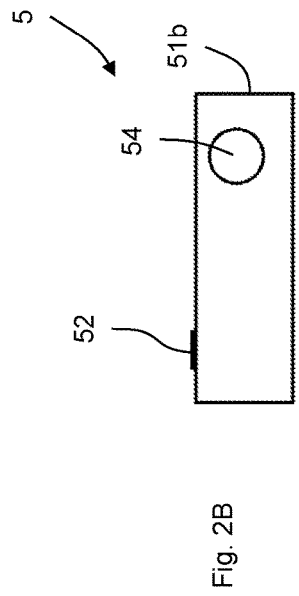
Fig. 2B
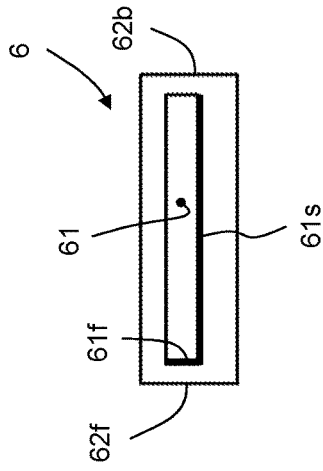
Fig. 2D
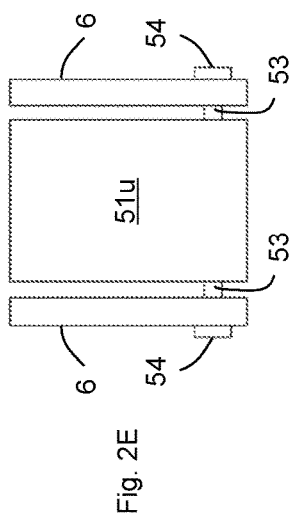
Fig. 2E
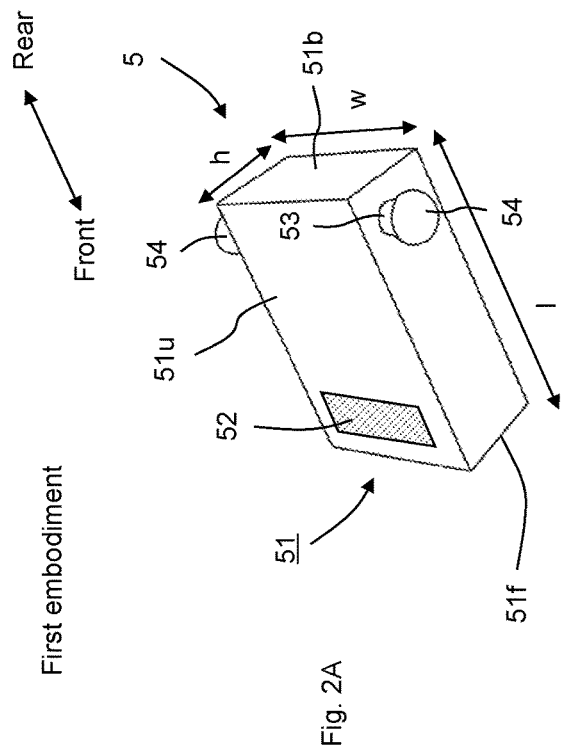
Fig. 2A
Fig. 2C
First embodiment

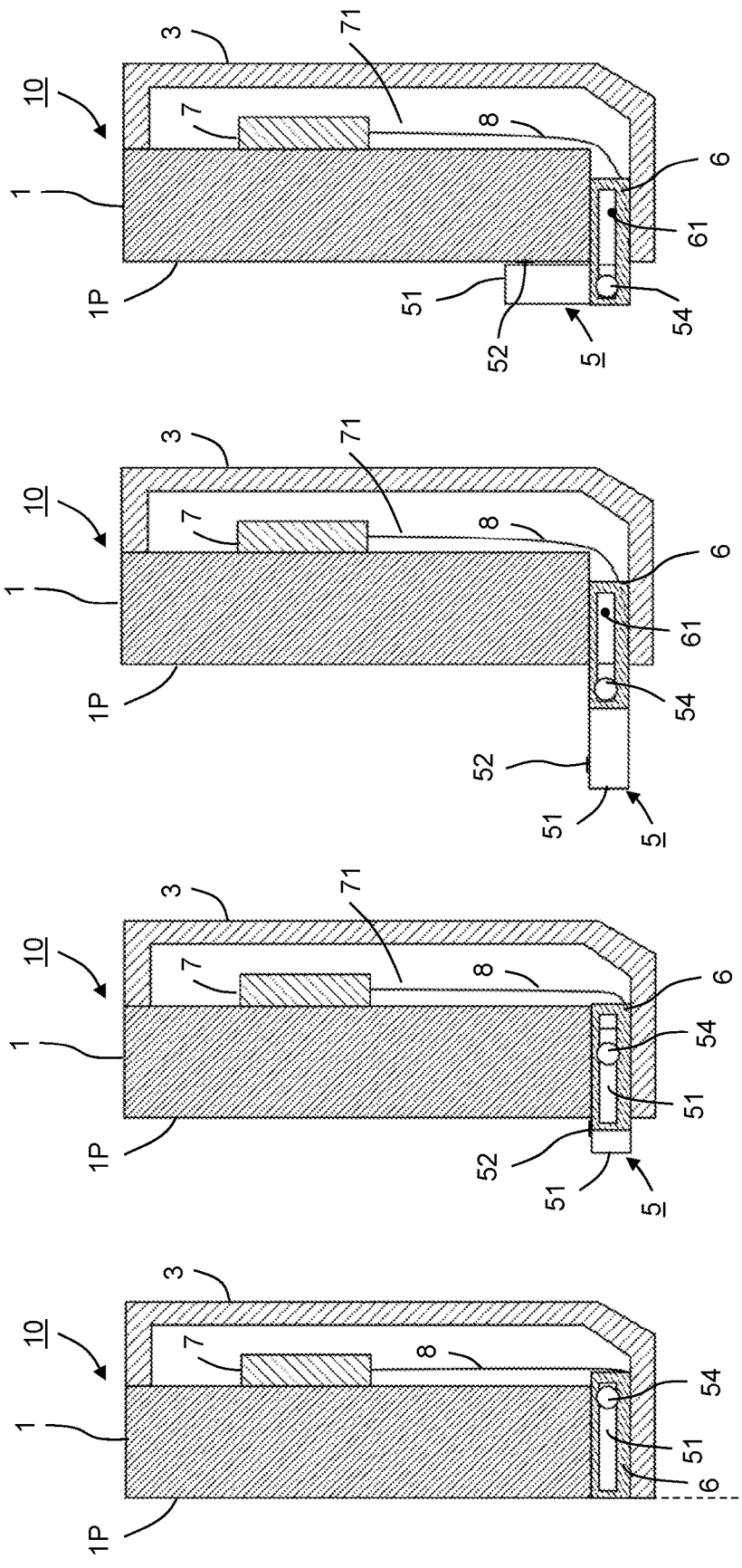

SENSOR UNIT DRIVING DEVICE

TECHNICAL FIELD

The present invention relates to a sensor unit driving device capable of protruding and retracting a sensor unit for sensing a display surface without projecting the bezel in front of the display surface while reducing a width of a bezel.

BACKGROUND ART

An image display device provided with a sensor unit for sensing a display surface is proposed in order to secure quality of an image displayed on a display surface.

In PTL 1, disclosed is a display device comprising a display panel for displaying an image, a bezel disposed at a peripheral edge of the display panel, a sensor member with a sensor for measuring a physical quantity of a display surface of the display panel, a rotation member for advancing and retreating the sensor member between the bezel and the display surface of the display panel, and an actuator provided on a rear surface side of the display panel for rotating the rotation member, in order to promote thinning of a bezel and a display device even if a sensor member is provided and to provide a display device with improved appearance and a measurement method of a display device.

CITATION LIST

Patent Literature

[PTL 1] WO-A1-2016-059712

SUMMARY OF INVENTION

Technical Problem

However, the display device disclosed in PTL 1 is configured to rotate the sensor member between the bezel and the display surface and thus requires a space for housing the sensor member. Therefore, it is necessary to project the bezel in front of the display surface and to set a width of the bezel equal to or greater than a width of the sensor member.

The present invention has been made in view of such circumstances and is to provide a sensor unit driving device capable of protruding and retracting a sensor unit for sensing a display surface without projecting a bezel in front of a display surface while reducing a width of a bezel.

Solution to Problem

According to the present invention, provided is a sensor unit driving device comprising: a display panel comprising a display surface for displaying an image; a sensor unit with a sensor; and an actuator driving the sensor unit, wherein the sensor unit is configured to be on a lateral surface side or a rear surface side of the display panel when the sensor unit is in a retreat position, and is configured so that the sensor faces the display surface when the sensor unit is in a detection position; and the actuator is configured to drive the sensor unit for switching between the retreat position and the detection position by a movement of the sensor unit.

According to the present invention, the sensor unit is configured to be on a lateral surface side or a rear surface side of the display panel when the sensor unit is in a retreat position, and is configured so that the sensor faces the display surface when the sensor unit is in a detection position. Further, the actuator is configured to drive the sensor unit for switching between the retreat position and the detection position by a movement of the sensor unit. This enables the sensor unit driving device to protrude and retract the sensor unit for sensing a display surface without projecting a bezel in front of a display surface while reducing a width of a bezel.

Hereinafter, various embodiments of the present invention are exemplified. The embodiments described below can be combined with each other.

Preferably, the actuator is provided on a lateral surface side or a rear surface side of the display panel.

Preferably, the sensor unit is configured to be moved to a front of the display surface and to rotate when the actuator drives the sensor unit, so that the sensor faces the display surface.

Preferably, the sensor unit driving device further comprises a cabinet for housing the sensor unit, and the sensor is provided on one lateral surface of the sensor unit and is configured to be housed in the cabinet at a position corresponding to the lateral surface side of the display panel when the sensor unit is in the retreat position.

Preferably, the sensor unit is configured not to project forward from the display surface in a side view of the display panel when the sensor unit is in the retreat position.

Preferably, the sensor unit is configured to be moved forward to a predetermined position and to rotate at the predetermined position when the actuator drives the sensor unit, so that the sensor faces the display surface.

Preferably, the sensor unit driving device further comprises a power transmission member connecting the sensor unit and the actuator, and the power transmission member is connected to the sensor unit to apply a rotation moment to the sensor unit at the predetermined position.

Preferably, the sensor unit driving device further comprises a slider supporting the sensor unit, and the slider is configured to be moved forward with the sensor unit when the actuator drives the sensor unit.

Preferably, the sensor unit driving device further comprises a rotation shaft provided on the sensor unit and a supporting part provided on the slider and supporting the rotation shaft, and the slider is configured to be moved forward with the supporting part moved by the rotation shaft.

Preferably, the sensor unit is configured to rotate around the rotation shaft when the sensor unit is moved forward with the slider to a predetermined position, so that the sensor faces the display surface.

BRIEF DESCRIPTION OF DRAWINGS

FIG. 1 is a perspective view of a sensor unit driving device 10 according to a first embodiment of the present invention as viewed from a side of a display panel 1. A drawing on a lower side is a partially enlarged view of a portion defined by a broken line. A plate member 51 included in the sensor unit driving device 10 is provided in a region X in FIG. 1.

FIGS. 2A to 2E are perspective views of members included in the sensor unit driving device 10 according to the first embodiment of the present invention.

FIG. 2A is a perspective view of a sensor unit 5.
FIG. 2B is a right-side view of the sensor unit 5.
FIG. 2C is a perspective view of a slider 6.
FIG. 2D is a right-side view of the slider 6.

FIG. 2E is a plan view in a state where two sliders 6 are attached from left and right sides of the sensor unit 5.

FIGS. 3A to 3D are conceptual views of a driving mode of the sensor unit driving device 10 according to the first embodiment of the present invention, and schematically illustrate a cross-sectional view taken along a line A-A in FIG. 1.

FIG. 3A is a conceptual view illustrating a state before the sensor unit 5 is driven (retreat position).

FIG. 3B is a conceptual view illustrating a state when the sensor unit 5 is being driven.

FIG. 3C is a conceptual view illustrating a state where the sensor unit 5 has been moved forward to a predetermined position.

FIG. 3D is a conceptual view illustrating a state where the sensor unit 5 has rotated and a sensor 52 faces the display panel 1 (detection position).

DESCRIPTION OF EMBODIMENTS

Figure 4:
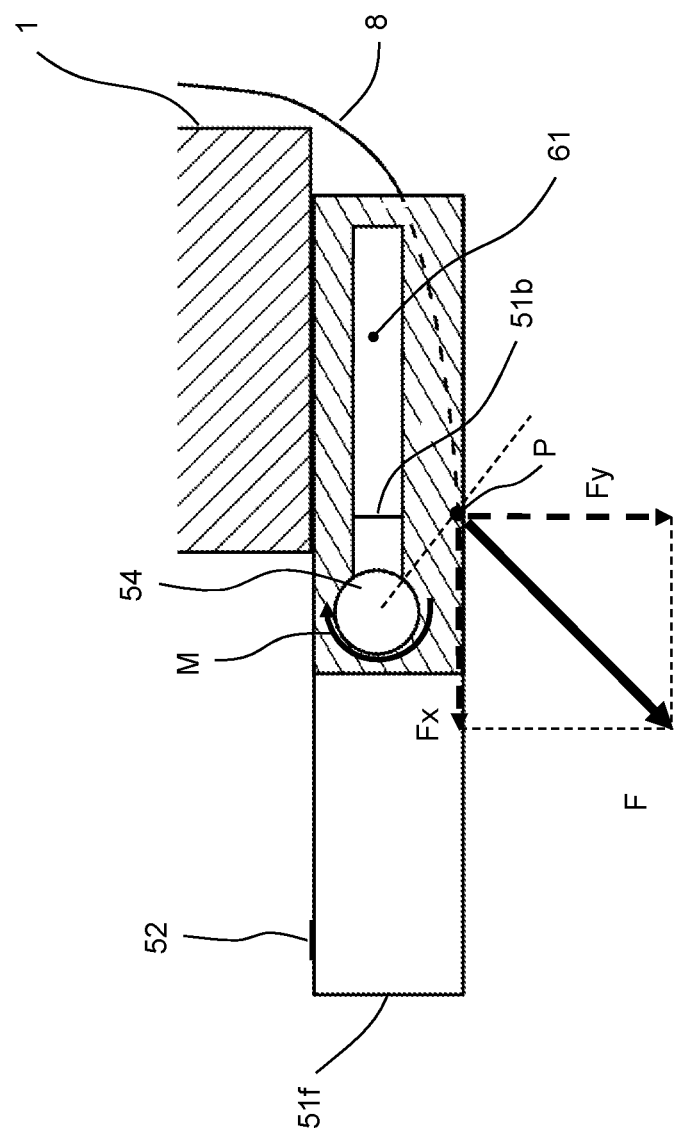
FIG. 4 is a partially enlarged view around a shaft end 54 in FIG. 3C.

Hereinafter, embodiments of the present invention will be described in detail with reference to the drawings. Various characteristics described in the embodiments below can be combined with each other.

First Embodiment

Hereinafter, the sensor unit driving device 10 according to the first embodiment of the present invention will be described with reference to FIGS. 1 to 4.

As illustrated in FIGS. 1 to 4, a display surface 1P for displaying an image is formed on a front surface of display panel 1. The sensor unit driving device 10 according to the first embodiment is configured to be, in a retreat position, on a lateral surface side of the display panel 1 (see FIG. 3A). Here, a lateral surface side of the display panel 1 refers to a position facing any of four lateral surfaces of the display panel 1 connecting the display surface 1P and a surface opposite to the display surface 1P.

The display panel 1 is supported by a cabinet 3, and a bezel 2 is provided in a lower part of the display panel 1. The cabinet 3 is a member at least partially covering a lateral surface and a rear surface of the display panel 1. A sensor unit 5 and a slider 6 are housed in the cabinet 3. The slider 6 is configured to be slidable in a front-rear direction. For example, the slider 6 is supported slidably in the front-rear direction by a rail provided on the display panel 1 or the cabinet 3. Here, the cabinet 3 in the first embodiment is a rear cover supporting the display panel 1 from a rear surface, but is not limited thereto. For example, the cabinet 3 may be configured with a member different from the rear cover.

An opening 4 is formed at a position indicated as a region X in an upper part of the bezel 2. A plate member 51 included in the sensor unit 5 and the slider 6 can be protruded and retracted through the opening 4.

Next, members included in the sensor unit driving device 10 are described with reference to FIGS. 2A to 2E.

As illustrated in FIG. 2A, the sensor unit 5 comprises a plate-shaped plate member 51, a sensor 52 provided on one lateral surface (top surface 51u) of the plate member 51, a rotation shaft 53 provided on left and right lateral surfaces of the plate member 51, and a shaft end 54 provided at an end of the rotation shaft 53 and having a diameter larger than that of the rotation shaft 53. Further, as illustrated in FIGS. 2A and 3, a power transmission member 8 is connected to a lower part of a rear surface 51b of the plate member 51. A front surface 51f is a front surface of the plate member 51 and is a surface facing to a front of the display panel 1. Here, one lateral surface of the plate member 51 refers to any of four surfaces connecting the front surface 51f and the rear surface 51b, and the top surface 51u corresponds to the one lateral surface in the first embodiment.

As illustrated in FIG. 2B, a central axis of the rotation shaft 53 and the shaft end 54 is provided above a center of the rear surface 51b. Here, FIG. 2B is a right-side view when a front-rear direction is set as an arrow direction in FIG. 2B.

In the first embodiment, a height h of the rear surface 51b is smaller than a length l and a width w of the plate member 51. Further, a direction along the height h of the rear surface 51b of the sensor unit 5 is substantially parallel to the display surface 1P when the sensor unit 5 is in the retreat position.

The sensor 52 measures various physical quantities derived from the display surface 1P of the display panel 1. For example, the sensor 52 measures luminance, saturation, brightness and the like of the display surface 1P.

As illustrated in FIGS. 2C and 2D, the slider 6 comprises a support member 61s supporting the rotation shaft 53. The slider 6 further comprises a regulation wall 61f regulating the sensor unit 5 at a predetermined position. In the first embodiment, the support member 61s and the regulation wall 61f are formed by a slide groove 61. Here, the slider 6 in the first embodiment is a member supporting the sensor unit 5 and is slidable with the sensor unit 5 in a front-rear direction of the display panel 1. In this regard, a shape of the slider 6 is not limited thereto and may be approximately U-shaped or L-shaped in a side view.

The slide groove 61 is formed to have a width capable of inserting the rotation shaft 53 thereto and smaller than a diameter of the shaft end 54. The rotation shaft 53 of the sensor unit 5 can thus move in and relative to the slide groove 61 of the slider 6. Then, when the sensor unit 5 is moved forward until the rotation shaft 53 abuts on the regulation wall 61f, the regulation wall 61f is pressed by the rotation shaft 53, so that the slider 6 is moved forward with the sensor unit 5. Further, by attaching the shaft end 54 after inserting the rotation shaft 53 into the slide groove 61, it is possible to prevent the sensor unit 5 from falling off the slider 6 even when an unexpected external force is applied.

As illustrated in FIG. 2D, the slide groove 61 is provided above a center of the rear surface 62b to correspond to a position of the rotation shaft 53 (shaft end 54). Further, as illustrated in FIG. 2E, two sliders 6 are prepared and attached from left and right sides of the sensor unit 5.

FIGS. 3A to 3D are conceptual views of a driving mode of the sensor unit driving device 10, and schematically illustrate a cross-sectional view taken along a line A-A in FIG. 1. As illustrated in FIG. 3A, the sensor unit driving device 10 according to the first embodiment comprises a monitor 1 comprising the display surface 1P for displaying an image, the sensor unit 5 with the sensor 52, and an actuator 7 driving the sensor unit 5. Further, the sensor unit 5 is configured to be on a lateral surface side of the display panel 1 when the sensor unit 5 is in a retreat position illustrated in FIG. 3A, and is configured so that the sensor 52 faces the display surface 1P when the sensor unit 5 is in a detection position illustrated in FIG. 3D.

The actuator 7 can be configured, for example, using a push solenoid and the like. When the actuator 7 is operated, the power transmission member 8 is pushed downward by a plunger 71 projecting downward in the drawings. Further, the actuator 7 is provided on a rear surface of the display panel 1. Here, an installation position of the actuator 7 is not limited thereto, and the actuator 7 may be provided on a lateral surface of the display panel 1.

When the actuator 7 drives the sensor unit 5, the sensor unit 5 and the sensor 52 are moved to a front of the display surface 1P, and the sensor unit 5 rotates so that the sensor 52 faces the display surface 1P.

As illustrated in FIGS. 3A to 3D, the sensor unit 5 is housed in the cabinet 3 at a position corresponding to a lateral surface side of the display panel 1. The sensor 52 is provided on one lateral surface of the plate member 51 (top surface 51u) included in the sensor unit 5. Further, as illustrated in FIG. 3A, the sensor unit 5 is configured not to project forward from the display surface 1P (forward from a front line FL) in a side view of the display surface 1P when the sensor unit is in the retreat position.

The power transmission member 8 connects the sensor unit 5 and the actuator 7. The power transmission member 8 can be configured with an elastic member. Further, it is preferable to use, as the power transmission member 8, a member that is less likely to be plastically deformed and is not easily broken due to an external force. Specifically, the power transmission member 8 is configured with an elastic plate spring. More specifically, the power transmission member 8 is configured with a member made of a super-elastic alloy (an alloy that regains, after being subjected to a bending or stretching load, its original shape when the load is removed). Further, the power transmission member 8 is connected to a lower part of the rear surface 51b of the plate member 51 included in the sensor unit 5. This is to apply a rotation moment to the sensor unit 5 in a state of FIG. 3C described below.

Hereinafter, a driving mode of the sensor unit driving device 10 is described. As illustrated in FIGS. 3A and 3B, the sensor unit 5 is configured to be, before the sensor unit 5 is driven, at a position so as not to project forward from the display surface 1P in a side view of the display panel 1. That is, the sensor unit 5 is disposed at a position facing four surfaces surrounding a periphery of the display panel 1 and not exceeding the front line FL illustrated in FIG. 3A in a forward direction.

When the actuator 7 is operated to measure a physical quantity derived from the display surface 1P, a state is shifted to a state of FIG. 3C via a state of FIG. 3B.

As illustrated in FIG. 3B, when the actuator 7 is operated, the plunger 71 projects downward, and thus the power transmission member 8 is pushed downward. Then, the power transmission member 8 presses the rear surface 51b of the plate member 51 included in the sensor unit 5, so that the sensor unit 5 is moved to the front of the display surface 1P (to a left direction in the drawings). At this time, as illustrated in FIG. 3B, the slider 6 is also slightly moved to the front of the display surface 1P (to a left direction in the drawings) due to a friction force between the rotation shaft 53 or the shaft end 54 of the sensor unit 5 and the slide groove 61 of the slider 6.

When the sensor unit 5 is further driven by the actuator 7, the shaft end 54 of the sensor unit 5 abuts on the regulation wall 61f of the slide groove 61 of the slider 6, so that the sensor unit 5 and the slider 6 are moved forward to a predetermined position, resulting in a state illustrated in FIG. 3C. After this state, both the sensor unit 5 and the slider 6 are not moved forward.

Next, rotation of the sensor unit 5 is described with reference to FIGS. 3C and 4. In a state of FIG. 3C, the plate member 51 included in the sensor unit 5 is pressed with an external force F downward to the left in FIG. 4 by the power transmission member 8 to apply a clockwise rotation moment M to the sensor unit 5 around the shaft end 54. Here, the external force F is the sum of a substantially horizontal external force Fx applied from the power transmission member 8 to the sensor unit 5 and a repulsive force Fy that causes the power transmission member 8 to regain an original shape thereof. As described above, since the power transmission member 8 is connected to the lower part of the rear surface 51b of the plate member 51, and the rotation shaft 53 as a rotation center is provided in an upper part of the sensor unit 5, the rotation moment occurs.

Then, a position of the slider 6 is regulated as illustrated in FIG. 3C, and thus the sensor unit 5 rotates clockwise around the shaft end 54. Consequently, the sensor unit 5 is in a state illustrated in FIG. 3D (detection position), and the sensor 52 provided on one lateral surface of the sensor unit 5 faces the display surface 1P.

Consequently, the sensor 52 can measure a physical quantity derived from the display surface 1P.

As described above, in the sensor unit driving device 10 according to the first embodiment, the sensor unit 5 with the sensor 52 is configured to be on a lateral surface side of the display panel when the sensor unit is in a retreat position, and the actuator 7 is configured to drive the sensor unit 5, so that the sensor 52 faces the display surface 1P by a movement of the sensor unit 5 and is shifted to a detection position. Such a configuration enables the bezel 2 to be formed without projecting to the front of the display surface 1P. Further, the sensor 52 is provided on one lateral surface (top surface 51u) of the sensor unit 5, and the height h of the rear surface 51b of the sensor unit 5 is substantially parallel to the display surface 1P when the actuator is not being operated (in a retreat position). Thus, it is possible to protrude and retract the sensor unit 5 for sensing the display surface 1P while reducing the width of the bezel.

Second Embodiment

Next, the sensor unit driving device 10 according to the second embodiment of the present invention is described with reference to FIGS. 5A and 5B.

Figure 5A:
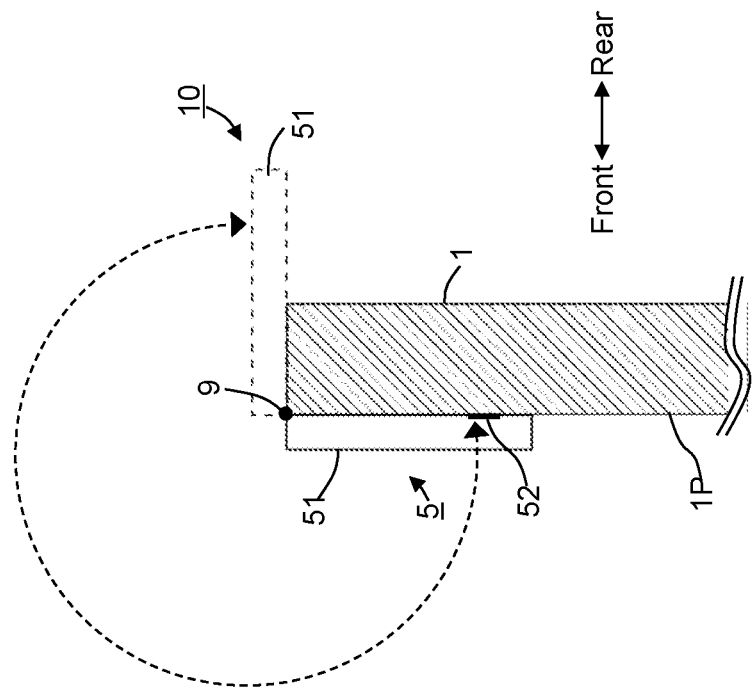
FIG. 5A is a conceptual view of a sensor unit driving device 10 according to a second embodiment of the present invention, illustrating a retreat position.
Figure 5B:
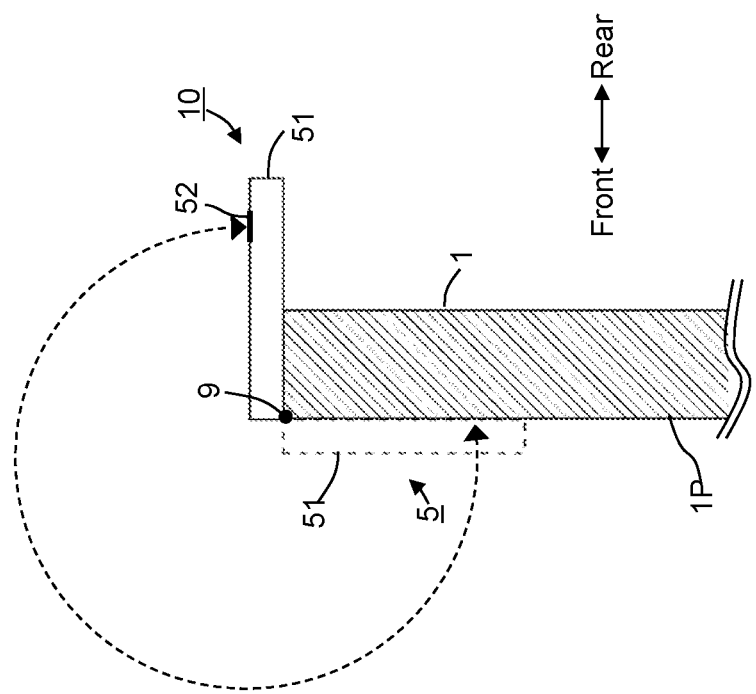
FIG. 5B is a conceptual view of the sensor unit driving device 10 according to the second embodiment of the present invention, illustrating a detection position.

As illustrated in FIGS. 5A and 5B, the sensor unit driving device 10 according to the second embodiment differs from the first embodiment in an arrangement position of the sensor unit 5.

As illustrated in FIG. 5A, the sensor unit 5 according to the second embodiment is disposed on an upper lateral surface side of the display panel 1 when the sensor unit 5 is in a retreat position, so that the plate member 51 included in the sensor unit 5 is disposed sideways. Further, a hinge 9 is provided at a tip of a top end of the display panel 1.

The sensor unit 5 is configured to rotate about 270 degrees around the hinge 9 by a driving member, such as an actuator or a motor (not illustrated). Here, a broken line in the drawings represents a locus when the sensor 52 moves. Consequently, as illustrated in FIG. 5B, the sensor unit 5 and the sensor 52 provided on one surface of the sensor unit 5 are moved to the front of the display surface 1P, and the sensor unit 5 is driven so that the sensor 52 faces the display surface 1P.

Third Embodiment

Next, the sensor unit driving device 10 according to the third embodiment of the present invention is described with reference to FIGS. 6A and 6B.

Figure 6A:
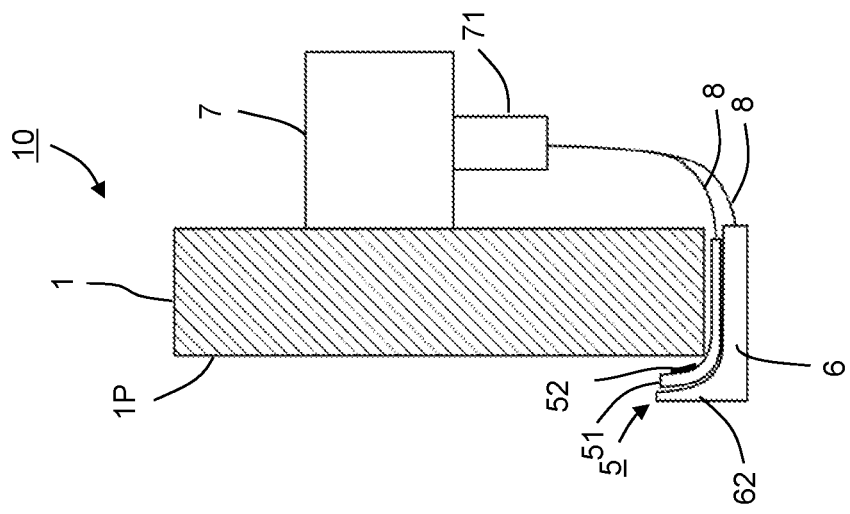
FIG. 6A is a conceptual view of a sensor unit driving device 10 according to a third embodiment of the present invention, illustrating a state before a sensor unit 5 is driven.
Figure 6B:
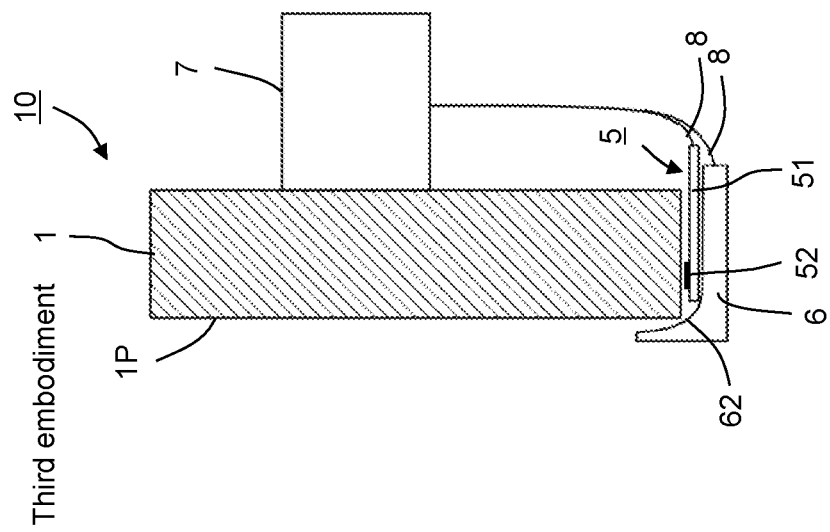
FIG. 6B is a conceptual view of the sensor unit driving device 10 according to the third embodiment of the present invention, illustrating a state where a sensor 52 faces a display panel 1 after the sensor unit 5 is driven.

As illustrated in FIGS. 6A and 6B, the sensor unit 5 according to the third embodiment differs from the first embodiment in configurations of the plate member 51 included in the sensor unit 5 and the slider 6.

In the sensor unit driving device 10 according to the third embodiment, an arc 62 is formed in a front part of the slider 6. Further, the plate member 51 is formed with a flexible member. The power transmission member 8 is connected to both the plate member 51 and the slider 6.

When the actuator 7 is operated from a state illustrated in FIG. 6A, both the plate member 51 and the slider 6 are moved forward. A movement of the slider 6 is then regulated in a predetermined position illustrated in FIG. 6B. At this time, the plate member 51 is deformed along the arc 62, and the sensor 52 provided one lateral surface of the plate member 51 faces the display surface 1P.

Others

The sensor unit driving device 10 according to the present invention is not limited to the various embodiments described above.

For example, the sensor unit 5 may be configured so that the sensor unit 5 in a retreat position is on a rear surface side of the display panel 1, and that the sensor 52 faces the display surface 1P when the sensor unit 5 is in a detection position. In this case, the sensor unit 5 may be provided, for example, at any position on the rear surface of the display panel 1 illustrated FIG. 3A. The sensor unit 5 may be also provided at any position in a space formed between the display panel 1 and the cabinet 3.

Further, an installation position of the sensor unit 5 and the slider 6 included in the sensor unit driving device 10 is not limited to a lower lateral surface side of the display panel 1. For example, the sensor unit 5 and the slider 6 may be provided on an upper, left, or right lateral surface side of the display panel 1.

Instead of providing the actuator 7 on a rear surface side of the display panel 1, the actuator 7 may be provided on a lateral surface side of the display panel 1. An installation position of the actuator 7 may be determined according to arrangement relationships among the display panel 1, the cabinet 3, and other members. In this regard, it is preferable to provide the actuator 7 on a lateral surface side or a rear surface side of the display panel 1. This is because, if the actuator 7 is provided on a front surface side of the display panel 1, the bezel has to project to the front of the display surface 1P in order to house the actuator 7.

The actuator may be configured with a pull solenoid. In this configuration, the sensor unit 5 is always biased forward, and the sensor 52 faces the display surface 1P (detection position). When a physical quantity derived from the display surface 1P is not measured, the actuator 7 is operated to control so as to move the sensor unite 5 to a lateral surface side of the display panel 1 (retreat position).

A shape memory alloy wire that can be expanded and contracted by energization may be used as the actuator 7, instead of a push solenoid and a pull solenoid. Further, a member capable of converting a rotation motion of a motor or the like into a linear motion may be used as the actuator 7. Further, the sensor unit 5 may be directly driven by the actuator 7 without using the power transmission member 8.

The sensor 52 may be provided inside the plate member 51, instead of being provided on one lateral surface of the plate member 51 (top surface 51u). In this case, an opening window for taking in the light detected by the sensor 52 is provided in a part where the sensor 52 is provided in FIG. 2A. A light blocking member for blocking external light may be attached in this case around the opening window. Further, a lens may be provided for the purpose of focusing light, instead of the opening window.

The shaft end 54 may be omitted. In this case, it is possible to prevent the sensor unit 5 from falling off the slider 6 even when an unexpected external force is applied, by adjusting a length of the rotation shaft 53.

REFERENCE SIGN LIST

1: Display panel
2: Bezel
3: Cabinet
4: Space
5: Sensor unit
51: Plate member
51u: Top surface
51b: Rear surface
52: Sensor
53: Rotation shaft
54: Shaft end
6: Slider
61: Slide groove
62: Arc
7: Actuator
71: Plunger
8: Power transmission member
9: Hinge
10: Sensor unit driving device

The invention claimed is:

1. A sensor unit driving device comprising:
a display panel comprising a display surface for displaying an image;
a sensor unit with a sensor;
an actuator driving the sensor unit;
a power transmission member connecting the sensor unit and the actuator, and
a rotation shaft provided on the sensor unit,
wherein the sensor unit is configured to be on a lateral surface side or a rear surface side of the display panel when the sensor unit is in a retreat position, and is configured so that the sensor faces the display surface when the sensor unit is in a detection position;
the actuator is configured to drive the sensor unit for switching between the retreat position and the detection position by a movement of the sensor unit;
the sensor unit is configured to be moved forward to a predetermined position and to rotate at the predetermined position when the actuator drives the sensor unit, so that the sensor faces the display surface; and
the power transmission member is configured to be pushed out when the actuator is operated, and is connected to the sensor unit so as to press the sensor unit to apply a rotation moment around the rotation shaft to the sensor unit after the sensor unit stops moving forward at the predetermined position and the rotation shaft is exposed in front of the display surface.

2. The sensor unit driving device of claim 1, wherein the actuator is provided on a lateral surface side or a rear surface side of the display panel.

3. The sensor unit driving device of claim 1, wherein the sensor unit is configured to be moved to a front of the display surface and to rotate when the actuator drives the sensor unit, so that the sensor faces the display surface.

4. The sensor unit driving device of claim 1, further comprising a cabinet for housing the sensor unit, wherein, the sensor is provided on one lateral surface of the sensor unit and is configured to be housed in the cabinet at a position corresponding to the lateral surface side of the display panel when the sensor unit is in the retreat position.

5. The sensor unit driving device of claim 1, wherein the sensor unit is configured not to project forward from the display surface in a side view of the display panel when the sensor unit is in the retreat position.

6. The sensor unit driving device of claim 1, further comprising a slider supporting the sensor unit, wherein the slider is configured to be moved forward with the sensor unit when the actuator drives the sensor unit.

7. The sensor unit driving device of claim 6, further comprising:
a supporting part provided on the slider and supporting the rotation shaft,
wherein the slider is configured to be moved forward with the supporting part moved by the rotation shaft.

8. The sensor unit driving device of claim 7, wherein the sensor unit is configured to rotate around the rotation shaft when the sensor unit is moved forward with the slider to the predetermined position, so that the sensor faces the display surface.

* * * * *